US010760660B2

(12) United States Patent
Hausladen et al.

(10) Patent No.: US 10,760,660 B2
(45) Date of Patent: Sep. 1, 2020

(54) HYDRAULIC UNIT

(71) Applicant: Liebherr-Components Biberach GMBH, Biberach and der Riß (DE)

(72) Inventors: Norbert Hausladen, Biberach (DE); Viktor Schindler, Uttenweiler (DE)

(73) Assignee: Liebherr-Components Biberach GMBH, Biberach an der Riss (DE)

( * ) Notice: Subject to any disclaimer, the term of this patent is extended or adjusted under 35 U.S.C. 154(b) by 67 days.

(21) Appl. No.: 15/491,537

(22) Filed: Apr. 19, 2017

(65) Prior Publication Data

US 2017/0248216 A1    Aug. 31, 2017

Related U.S. Application Data

(63) Continuation of application No. PCT/EP2015/002074, filed on Oct. 20, 2015.

(30) Foreign Application Priority Data

Oct. 20, 2014   (DE) .................... 20 2014 008 340 U
Nov. 17, 2014   (DE) .................... 20 2014 009 106 U

(51) Int. Cl.
*F16H 45/00* (2006.01)
*B66C 13/12* (2006.01)
(Continued)

(52) U.S. Cl.
CPC ............. *F16H 45/00* (2013.01); *B60K 17/28* (2013.01); *B66C 13/12* (2013.01); *B66C 13/20* (2013.01);
(Continued)

(58) Field of Classification Search
CPC ........................................................ F16H 47/00
See application file for complete search history.

(56) References Cited

U.S. PATENT DOCUMENTS 4,324,387 A   4/1982 Steinhagen
4,589,535 A * 5/1986 Hall ........................ F01P 7/085
                                                      184/6.16
(Continued)

FOREIGN PATENT DOCUMENTS

CN       1103839       6/1995
CN       103307135     9/2013
(Continued)

*Primary Examiner* — Mark A Manley
(74) *Attorney, Agent, or Firm* — Levine Bagade Han LLP

(57) ABSTRACT

The present invention relates to a hydraulic unit with a housing in which a hydraulic converter is accommodated, which is coupled with a drive shaft that includes a connecting shaft piece located outside the housing for connection to a mechanical drive element The invention furthermore relates to a hydraulic driving device with such hydraulic unit and to a drive train connecting piece to which the hydraulic unit is connected.
It is proposed to integrate a clutch for connecting and disconnecting the hydraulic unit into the hydraulic unit itself, so that a mechanical drive train, to which the hydraulic unit is connected, can remain unchanged or need not especially be adapted to the clutch. In accordance with the invention, a clutch for coupling and uncoupling the connecting shaft piece of the hydraulic unit to and from the hydraulic converter of the hydraulic unit is accommodated in the housing of the hydraulic unit.

17 Claims, 3 Drawing Sheets

(51) Int. Cl.
*F16D 33/00* (2006.01)
*B66C 13/20* (2006.01)
*F16D 47/06* (2006.01)
*B60K 17/28* (2006.01)
*E02F 9/12* (2006.01)
*F16C 33/66* (2006.01)
*F16D 13/52* (2006.01)
*F16D 25/061* (2006.01)
*B66C 23/86* (2006.01)
*F16D 25/0638* (2006.01)
*F16D 31/00* (2006.01)
*F16D 13/54* (2006.01)
*F16H 47/00* (2006.01)
*B66C 23/00* (2006.01)

(52) U.S. Cl.
CPC .............. *B66C 23/86* (2013.01); *E02F 9/123* (2013.01); *F16C 33/6677* (2013.01); *F16D 13/54* (2013.01); *F16D 25/061* (2013.01); *F16D 25/0638* (2013.01); *F16D 31/00* (2013.01); *F16D 33/00* (2013.01); *F16D 47/06* (2013.01); *F16H 47/00* (2013.01); *B66C 23/54* (2013.01); *F16C 2361/43* (2013.01)

(56) References Cited

U.S. PATENT DOCUMENTS

| | | |
|---|---|---|
| 5,221,101 A | 6/1993 | Okubo et al. |
| 2009/0292432 A1* | 11/2009 | Suzuki ................ F16D 25/0638 701/68 |
| 2010/0006387 A1* | 1/2010 | Lee ........................ B62D 5/063 192/69.82 |
| 2013/0098200 A1* | 4/2013 | Kurihara ................ B60K 17/10 74/661 |
| 2013/0140122 A1* | 6/2013 | Hemphill ................ F16D 39/00 192/3.25 |
| 2013/0313063 A1* | 11/2013 | Fujii ...................... F16D 13/648 192/66.3 |
| 2013/0316874 A1* | 11/2013 | Lucienne ................ B60K 17/10 477/168 |
| 2014/0284164 A1* | 9/2014 | Akimoto ................ F16D 25/123 192/66.3 |
| 2014/0284168 A1* | 9/2014 | Niwata .................... F16D 13/74 192/85.61 |
| 2014/0305388 A1 | 10/2014 | Gay et al. |

FOREIGN PATENT DOCUMENTS

| | | |
|---|---|---|
| CN | 103423338 A | 12/2013 |
| DE | 3102023 | 12/1981 |
| DE | 19628781 | 1/1998 |
| DE | 19701670 | 7/1998 |
| DE | 20302534 | 7/2003 |
| DE | 10349030 | 10/2005 |
| DE | 202005018966 | 5/2007 |
| DE | 102007046696 | 4/2009 |
| DE | 102007063360 | 12/2009 |
| DE | 102009023869 | 12/2009 |
| EP | 0357580 | 3/1990 |
| EP | 2789488 | 10/2014 |
| WO | WO 2016/062397 | 4/2016 |

* cited by examiner

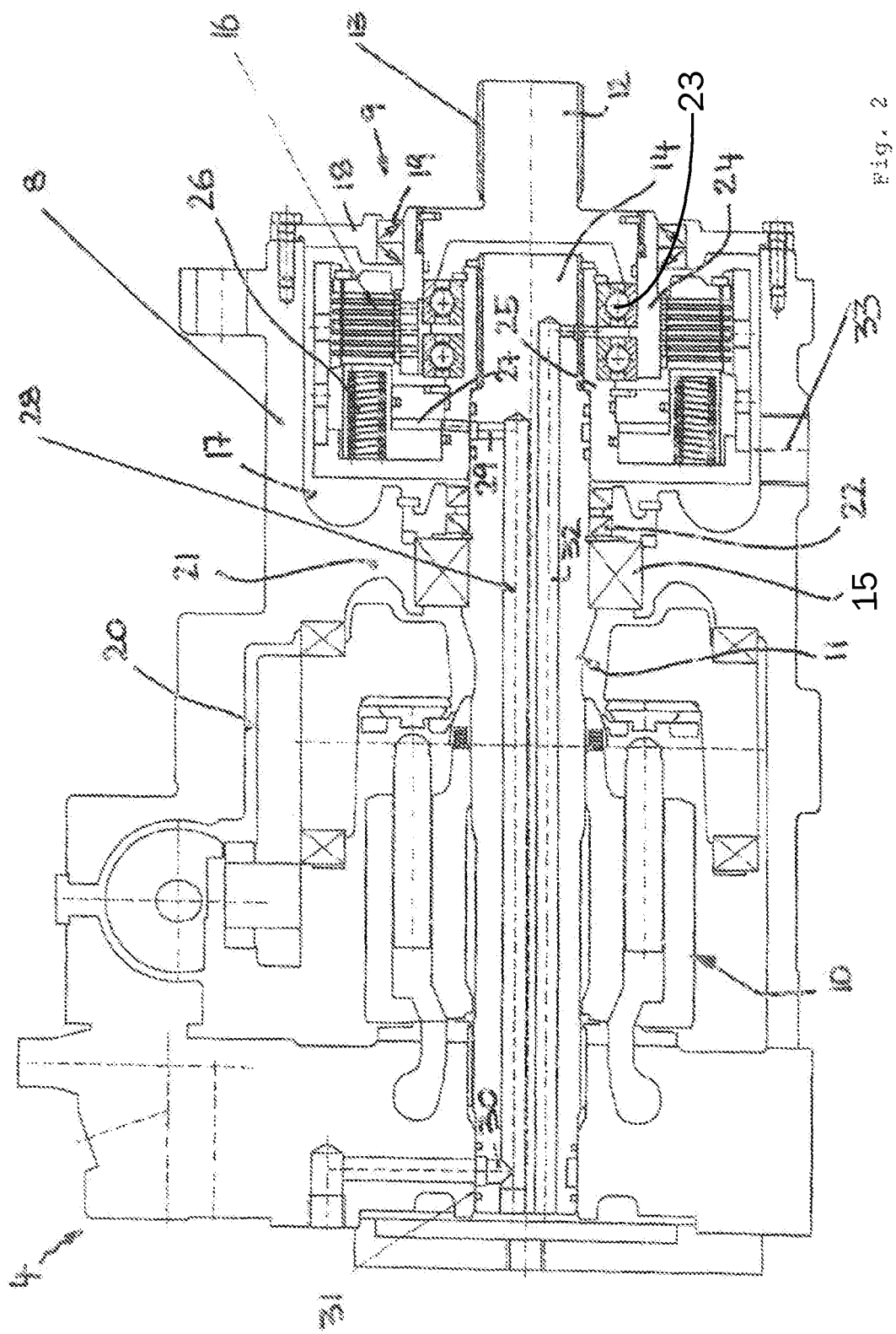

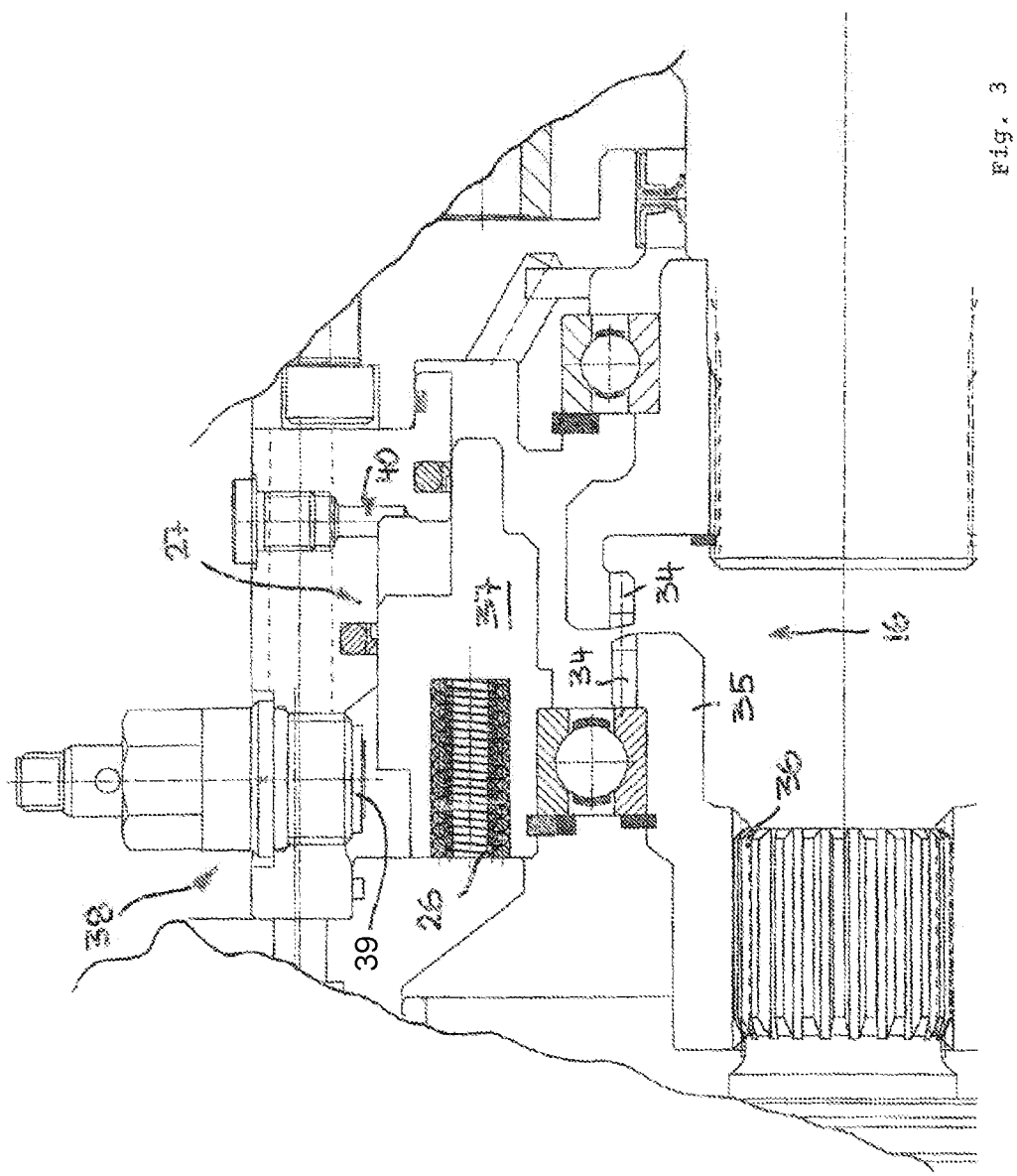

HYDRAULIC UNIT

CROSS-REFERENCE TO RELATED APPLICATIONS

This application is a continuation of International Application No. PCT/EP2015/002074, filed Oct. 20, 2015, which claims priority to German Utility Model Application No. 20 2014 008 340.1, filed Oct. 20, 2014, and German Utility Model No. 20 2014 009 106, filed Nov. 17, 2014, issued Jan. 25, 2016, all of which are incorporated by reference herein in their entireties.

BACKGROUND

1) Technical Field

The present invention relates to a hydraulic unit with a housing in which a hydraulic converter is accommodated, which is coupled with a drive shaft that includes a connecting shaft piece located outside the housing for connection to a mechanical drive element. The invention furthermore relates to a hydraulic driving device with such hydraulic unit and to a drive train connecting piece to which the hydraulic unit is connected.

2) Description of the Related Art

In hydraulic drive systems hydraulic units often are dragged along at idle, when the assembly coupled with the respective hydraulic unit is not needed at the moment or need not be actuated. When the hydraulic unit is dragged along in this way, corresponding drag torques occur, which as power loss deteriorate the total efficiency of the machine or the system and/or unnecessarily increase the total demand of energy.

Such dragging along of hydraulic units for example occurs in driving devices which as drive train connecting piece comprise a transfer or combination gear to which several hydraulic units can be connected. For example, construction machines, cranes, earth-moving machines and the like frequently have a driving device in which a combustion engine for example in the form of a Diesel engine or another primary engine drives a pump transfer gear via a drive train, to which pump transfer gear several hydraulic units in the form of pumps are connected, in order to drive various components of the machine. For example, a hydraulic unit can supply a hoisting gear which is responsible for lifting at the crane, while another hydraulic unit is coupled with a slewing gear which is responsible for tuning the crane. When turning for example is completed earlier than lifting, the hydraulic unit of the slewing gear is at idle, whereby corresponding churning losses or drag losses occur. This also applies analogously for driving devices with several hydraulic motors to which a combination gear is connected, for example in the form of a cable winch with multi-motor drive, when for example in partial load operation as such one or more hydraulic motors can be switched off.

Similarly, such drag losses in general hence can also occur in hydraulic units utilized as motor, for example when during a positioning movement by a positioning motor another positioning motor, which for example can be responsible for the positioning movement in the opposite direction, is dragged along. In so far, hydraulic unit in the sense of the present invention can be understood to be both a pump and a motor.

To avoid such drag losses it has already been thought about providing a clutch in the mechanical drive trains, for example in the region of the transfer gears or between the transfer gear and the respective hydraulic unit, in order to be able to uncouple a hydraulic unit that is not required from the mechanical drive train. Such clutches, however, have the disadvantage that they must be adapted to the respective application and the space conditions in the region of the mechanical drive train often are insufficient.

Proceeding therefrom, it is the object underlying the present invention to create an improved hydraulic unit and an improved hydraulic driving device with such hydraulic unit, which avoid disadvantages of the prior art and develop the latter in an advantageous way. In particular, the power loss as a result of drag torques of hydraulic units dragged along at idle should be avoided, without therefor sacrificing the ease of assembly of standard modular systems with matching hydraulic and mechanical parts of the drive train and without therefor creating space problems in the region of the transfer gears.

SUMMARY OF THE INVENTION

In accordance with the invention, said object is solved by a hydraulic unit according to claim 1 and by a hydraulic driving device according to claim 14. Preferred aspects of the invention are subject-matter of the dependent claims.

It hence is proposed to integrate a clutch for connecting and disconnecting the hydraulic unit into the hydraulic unit itself, so that a mechanical drive train, to which the hydraulic unit is connected, can remain unchanged or need to especially be adapted to the clutch. In accordance with the invention, a clutch for coupling and uncoupling the connecting shaft piece of the hydraulic unit to and from the hydraulic converter of the hydraulic unit is accommodated in the housing of the hydraulic unit. The user can incorporate the hydraulic unit in a manner known per se, without having to make any adaptations with respect to conventional solutions on the drive train itself, so that no space problems arise in the region of the mechanical drive train, in particular of a transfer gear. Nevertheless, churning losses due to idling hydraulic units can be reduced considerably, whereby a significant reduction of the power loss at idle can be achieved.

The clutch integrated into the housing of the hydraulic unit in principle can be actuated in various ways. To achieve a good system compatibility, the clutch can be formed to be hydraulically actuatable in accordance with a development of the invention. As a result, hydraulic components present already on the hydraulic unit can be utilized and/or hydraulic actuating elements compatible therewith can be used, in order to actuate the clutch for coupling and uncoupling the hydraulic unit.

To ensure the function of the hydraulic unit in the case of an energy failure in the sense of an emergency operation, the clutch can comprise an energy-autarkical pretensioning device for pretensioning the clutch into the engaged position, so that in the case of an energy failure and/or failure of the actuator supplied with external energy the clutch is moved into the engaged position and the hydraulic unit correspondingly is connected to the mechanical drive train in a predetermined way via the connecting shaft piece. The actuator for disengaging the clutch is formed such that it overcomes and/or disables the pretensioning forces of said pretensioning device, in order to be able to move the clutch into the disengaged position against the pretension of the pretensioning device. Said actuator advantageously can be a hydraulic actuator, which provides hydraulic pressure that is able to move the clutch into the disengaged position. In principle, said actuator also might operate in some other way, for example comprise an electromagnetic actuator, wherein however said hydraulic formation of the actuator in the aforementioned way improves the system compatibility.

Said energy-autarkical pretensioning device likewise can be formed differently. For example, a separate, autarkical hydraulic pressure accumulator can be provided, which applies a hydraulic pretensioning pressure onto the clutch, in order to move the clutch into the engaged position. Alternatively or in addition, the pretensioning device also can comprise another spring means for pretensioning the clutch into the engaged position, wherein said spring means for example can comprise a mechanical spring.

To provide for easy engagement, which is insensitive to relative movements of the clutch parts relative to each other, the clutch can be formed as multidisk clutch, wherein said actuator is able to move the disks apart, while the pretensioning device is able to frictionally press the disks against each other.

Alternatively, the clutch also can be formed as claw clutch, whereby an in particular radially very small-size clutch can be achieved. In addition, the clutch can do with small actuating forces.

To avoid expensive rotary unions between housing and clutch or between the clutch parts, the hydraulic actuator according to a development of the invention can comprise a supply channel for supplying hydraulic oil for hydraulically switching the clutch, which is guided through the drive shaft of the hydraulic unit. In particular, said supply channel can extend through this drive shaft approximately parallel to the longitudinal axis of the drive shaft, wherein said supply channel on the other hand can be connected with the clutch and/or a pressure port by transverse channels. The hydraulic pressure for actuating the clutch in particular can be supplied through the clutch part rotating with the drive shaft. For this purpose, said supply channel can be in flow connection with said rotating clutch part by the drive shaft and/or a be in flow connection with a supply channel portion by said clutch part.

Said drive shaft can be of multipart design or comprise two shaft pieces rotatable relative to each other. On the one hand, said drive shaft can comprise the external connecting shaft piece mentioned already. On the other hand, the drive shaft can include an inner drive shaft piece arranged in the interior of the housing, which is non-rotatably connected with the hydraulic converter and which by said clutch is releasably non-rotatably connectable with said external connecting shaft piece. The above-mentioned supply channel can extend through said inner drive shaft piece.

As an alternative to such arrangement of the clutch between two pieces of the drive shaft, the clutch in principle also can be arranged between the drive shaft and the hydraulic converter, wherein in such a case the drive shaft can be formed in one piece, as by said clutch it can directly be coupled to the hydraulic converter or to a converter part connected therewith.

To provide for an axially short construction, said clutch can be arranged radially on the outside above said drive shaft, in particular above the aforementioned inner drive shaft piece and/or the connecting shaft piece which comprises a portion extending outside the housing. Due to such arrangement of the clutch moved radially to the outside a piece of the drive shaft can extend through the clutch, so that the overall axial length becomes hardly longer than in a hydraulic unit without integrated clutch. On the other hand, when the overall axial length of the hydraulic unit is not so important, said clutch can however also be arranged on the end face between two shaft pieces of the drive shaft and bridge the gap between the shaft pieces, so to speak.

In an advantageous development of the invention the housing of the hydraulic unit at the same time serves as clutch housing. The housing of the hydraulic unit here can have a clutch chamber in which the clutch is accommodated and which is closed towards an outside of the housing, so that the clutch is accommodated in the interior of the housing in a protected way.

In particular, the housing of the hydraulic unit can have a multi-chamber system and/or be divided into several subchambers. Advantageously, the housing can comprise a converter chamber in addition to said clutch chamber, in which the hydraulic converter is accommodated, wherein advantageously the converter and clutch chambers can be separated from each other by at least one housing wall. Depending on the required tightness of the individual chambers an oil seal can be provided between the clutch and converter chambers. For example, said housing wall which extends between clutch chamber and converter chamber can be sealed against the drive shaft by means of a seal, which drive shaft can extend through the housing wall.

The clutch chamber can also be sealed towards the outside of the housing by means of a seal. For example, the housing can comprise a housing cover which delimits the clutch chamber on the end face and through which the connecting shaft piece can extend. A seal can seal said cover against said connecting shaft piece.

Said drive shaft advantageously can be rotatably supported or mounted on the housing, wherein a corresponding pivot bearing advantageously can be provided between the hydraulic converter and said clutch. For example, said pivot bearing can support the drive shaft with respect to the housing wall which separates the clutch chamber from the converter chamber.

In a development of the invention a monitoring device can be associated to the clutch, in order to monitor the state of engagement of the clutch, in particular to determine whether the clutch is in the engaged or disengaged position. The clutch position in principle can be monitored or determined in various ways, wherein the monitoring device advantageously can be formed to operate electronically. In particular, the monitoring device can comprise a position sensor which detects the position of a movable clutch part, in particular whether said clutch part is in a disengaged or an engaged position. Alternatively or in addition to such position sensor, the monitoring device also can comprise a pressure sensor which detects the actuating pressure with which the clutch is hydraulically actuated. When the clutch for example is pretensioned into the engaged position by a spring means and is disengaged by hydraulic pressure, as explained above, it can be assumed that the clutch is disengaged when a predetermined pressure is reached or exceeded, whereas when the predetermined pressure or also another predetermined, for example lower pressure, is not reached, i.e. when the actuating pressure remains below a predetermined value, it can be assumed that the clutch is engaged due to the spring pretension.

In an advantageous development of the invention the monitoring device also can be formed to operate redundantly and comprise two monitoring means acting independent of each other, for example the aforementioned position sensor and the aforementioned pressure sensor.

Said hydraulic converter converts hydraulic energy into mechanical energy and/or vice versa mechanical energy into hydraulic energy. For example, said hydraulic converter can be a pump rotor in the manner of a blade wheel. Of course, however, other types of converter also are possible. For example, the hydraulic unit can comprise a swash plate pump and/or swash plate motor with adjustable absorption volume. Depending on the system requirements various types of converter can be provided.

BRIEF DESCRIPTION OF THE DRAWINGS

The invention will subsequently be explained in detail with reference to a preferred exemplary embodiment and associated drawings. In the drawings:

FIG. 2: shows a longitudinal section through the hydraulic unit of FIG. 1, which includes the integrated clutch, and FIG. 3: shows a partial longitudinal sectional representation of a clutch formed as claw clutch, to which a monitoring device for monitoring the clutch position is associated.

DETAILED DESCRIPTION

Figure 1:
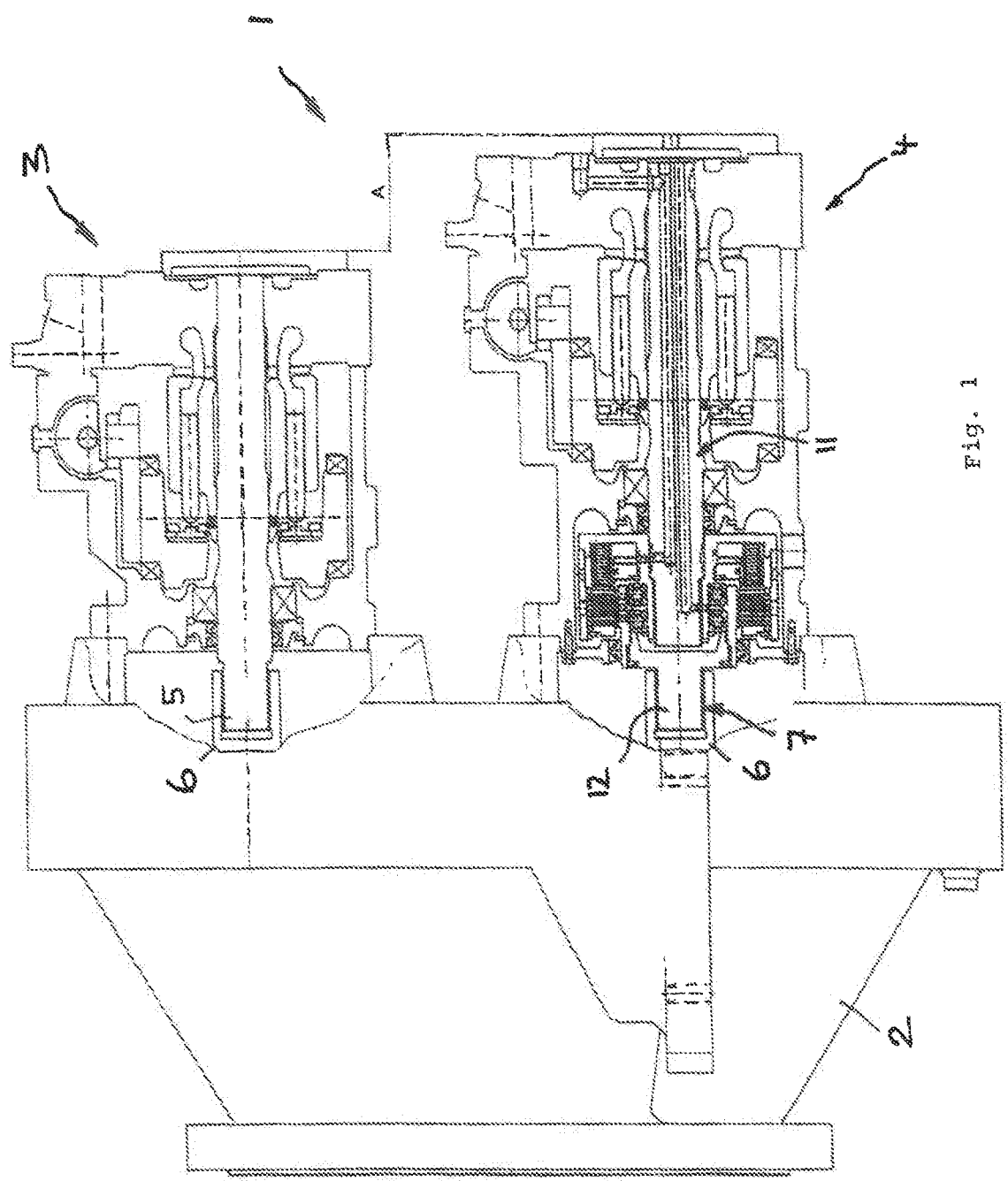
FIG. 1: shows a partly sectional side view of a transfer gear with flange-mounted hydraulic units of a hydraulic driving device, wherein a lower hydraulic unit in the representation of FIG. 1 includes an integrated clutch for coupling and uncoupling the hydraulic unit, while the upper hydraulic unit as shown in FIG. 1 is formed in a conventional way without such clutch.

As shown in FIG. 1, the hydraulic driving device 1 can comprise a transfer gear 2 to which several hydraulic units 3 and 4 are connected, wherein said hydraulic units 3 and 4 for example can form pumps, in order to provide hydraulic pressure for driving various assemblies which are not especially shown in the Figures. Such assemblies for example can be hoisting gears, slewing gears or luffing gears of cranes, actuating drives of dumpers, drum drives and hoisting gears of mixers or other drive assemblies of other machines which are operable by means of hydraulic pressure. Alternatively, however, the several hydraulic units 3 and 4 also might be connected to a combination gear or a drive train connecting piece of a multi-motor drive for example of a winch, wherein the hydraulic units 3 and 4 in this case would operate as hydraulic motors.

On the input side said transfer gear 2 can be driven via a mechanical drive train, for example from a combustion engine, which can be connected with the transfer gear 2 via a suitable transmission or a suitable drive train. Alternatively, however, it would also be possible to drive said transfer gear 2 itself also hydraulically or possibly also electrically on the input side, in order to comply with the respective drive concept.

The transfer gear 2 distributes the input power introduced on the input side on several output shafts, via which the drive shafts of said hydraulic units 3 and 4 are driven. As shown in FIG. 1, the hydraulic units 3 and 4 therefor can be flange-mounted to the transfer gear 2, so that connecting shaft pieces 5 and 12 protruding from the end face of the hydraulic units 3 and 4 can be brought in non-rotatable engagement with output shafts 6 of the transfer gear 2, for example via a sleeve or spline shaft connection 7 or another suitable connecting piece which ensures a non-rotatable connection with the respective output shaft 6 of the transfer gear 2. The connecting dimensions of the connecting pieces of the transfer gear 2 and on the other hand the connecting dimensions of the several hydraulic units 3 and 4 can correspond to each other and each be equally contoured or configured, so that the hydraulic units 3 and 4 can be attached to various connecting points of the transfer gear 2 according to a modular principle.

The upper hydraulic unit 3 as shown in FIG. 1 as such is a conventional hydraulic unit without integrated clutch for coupling and uncoupling and in essence is shown for comparison purposes and to illustrate that conventional hydraulic units without integrated clutch and hydraulic units with integrated clutch equally can be attached to the transfer gear 2 and can be exchanged for each other.

The lower hydraulic unit 4 as shown in FIG. 1 is illustrated in detail in FIG. 2 and has a housing 8 which has an end face 9 adapted to the connecting pieces of the transfer gear 2 in the above-mentioned way, in order to be flange-mounted or be mounted in some other way to the transfer gear 2.

The hydraulic unit 4 has a hydraulic converter 10 accommodated in the housing 8, which converts the mechanical energy introduced from the transfer gear 2 into hydraulic energy. For example, said hydraulic converter 10 can comprise a pump stage which for example can comprise a blade wheel or in particular also a swash-plate piston pump assembly. Said hydraulic converter 10 is driven by a drive shaft 11 which is rotatably mounted on the housing 8 and is non-rotatably connected with said hydraulic converter 10. Said drive shaft 11 partly can extend in the housing 8 and comprise a portion in the form of a connecting shaft piece 12 exiting from said end face 9 of the housing 8, which can be connected to the output shaft 6 of the transfer gear 2. As shown in FIG. 2, the connecting shaft piece 12 therefor can comprise a spline shaft profile 13.

The drive shaft 11 of the hydraulic unit 4—in contrast to the drive shaft of the hydraulic unit 3—is not formed in one piece and molded continuously up to the connecting shaft piece 12, but is formed in two parts or in several parts. In particular, the drive shaft 11 can comprise an inner drive shaft piece 14 accommodated in the housing 8, which is non-rotatably connected with the hydraulic converter 10 and in the interior of the housing 8 is non-rotatably supported on the housing 8, for example by the pivot bearings 15 as shown in FIG. 2.

With the connecting shaft piece 12 exiting from the housing 8 said inner drive shaft piece 14 is releasably connectable in a torque-transmitting manner via a clutch 16, in order to selectively be able or not be able to transmit the drive movement of the connecting shaft piece 12 to the inner drive shaft piece 14. By means of said clutch 16 the hydraulic converter 10 can be coupled to or be uncoupled from the connecting shaft piece 12.

As shown in FIG. 2, the inner drive shaft piece 14 can be arranged parallel, in particular also coaxially to the connecting shaft piece 12. In the case of an only parallel arrangement with an offset between the shaft axes a spur gear stage might be interposed, while in the case of a coaxial arrangement of the two connecting and drive shaft pieces 12 and 14 a connection is possible via the clutch 16 without interposition of further transmission elements such as gear wheel stages and the like. In particular, a direct flux of force between the inner drive shaft piece 14 and the connecting shaft piece 12 can be achieved by the clutch 16.

Said clutch 16 advantageously can be arranged between the hydraulic converter 10 and the connecting shaft piece 12, in particular adjacent to the end face 9 with which the hydraulic unit 4 can be flange-mounted to the transfer gear 2. The clutch 16 is accommodated in the housing 8, so that the clutch 16 is integrated into the hydraulic unit 4. From the outside, the hydraulic unit as such does not reveal that the connecting shaft piece 12 can be coupled to and uncoupled from the hydraulic converter 10. As shown in FIG. 1, there merely is obtained an overall axial length slightly increased by the measure A.

Said clutch 16 advantageously is accommodated in a clutch chamber 17 of the housing 8, which is closed towards the outer environment, for example by a peripheral wall 8u of the housing 8 and a releasable housing cover 18 on the end face, through which the connecting shaft piece 12 is guided. As shown in FIG. 2, the housing 8, in particular the housing cover 18 can be sealed, in particular be sealed in a hydraulic-fluid-tight manner by a seal 19 against the connecting shaft 12 guided therethrough. The clutch chamber 17 in so far is sealed towards the environment.

Said clutch chamber 17 advantageously can be delimited against a converter chamber 20 in which the hydraulic converter 10 is accommodated, in particular by a housing wall 21 extending transversely to the longitudinal direction of the drive shaft 11, which divides the interior space of the housing 8 into several chambers. The aforementioned drive shaft 11 can be supported on said housing wall 21 by said pivot bearing 15. In addition, a seal 22 can seal the two coupling and converter chambers 17 and 20 from each other, wherein possibly however a non-sealed formation also would be possible.

As shown in FIG. 2, the connecting shaft piece 12 can be rotatably supported or mounted on the inner drive shaft piece 14 by means of an anti-friction bearing 23, wherein the anti-friction bearing 23 can be provided between corresponding clutch parts which on the one hand are connected to the inner drive shaft piece 14 and on the other hand to the connecting shaft piece 12.

As shown in FIG. 2, the clutch 16 can be arranged radially outside or above the connecting and drive shaft pieces 12 and 14. Said drive and connecting shaft pieces 14 and 12 can engage over each other in a pot-like manner, for example the connecting shaft piece 12 can be connected with a ring- or sleeve-shaped coupling piece 24 which encloses the drive shaft piece 14. With said inner drive shaft piece 14 a further coupling piece 25 can be non-rotatably connected, so that the two coupling pieces 24 and 25 as such are rotatable relative to each other, in particular are rotatably supported on each other via the anti-friction bearing 23, wherein the rotatability of course only is given in the disengaged state of the clutch 16.

Said clutch 16 in principle can be formed differently, for example in the form of a multidisk clutch, so that it can be engaged also in the case of relative rotations or in various positions rotated relative to each other.

The clutch 16 advantageously comprises a pretensioning device 26 by means of which the clutch is pretensioned into the engaged position. In particular, the pretensioning device 26 can comprise one or more springs 26 by means of which the disks or the engaging elements of the clutch are pressed against each other.

To be able to disengage the clutch 16 an actuator 27 is provided, which advantageously can be formed to operate hydraulically. In particular, by introducing hydraulic pressure into an actuating chamber of the clutch 16, which is located between the two clutch parts 24 and 25, the pretension of the pretensioning device 26 can be overcome and the disks can be separated from each other or be relieved to such an extent that they can slip through.

The hydraulic actuator 27 advantageously can comprise a supply line 28 which can extend through the drive shaft 11, in particular through the inner drive shaft piece 14. Said supply line 28 in particular can extend parallel to the longitudinal axis of the drive shaft 11 and also lead through the hydraulic converter 10. In the region of the clutch 16 the supply line 28 can be connected with said clutch actuating chamber of the clutch 16 by means of a transverse channel 29. At the other end the supply line 28 likewise can be connected for example to a rotary union 31 via a transverse channel 30, in order to be able to supply the actuating pressure for coupling and uncoupling and/or for actuating the clutch 16.

As shown in FIG. 2, a lubricating oil supply line 32 also can advantageously be guided through the inner drive shaft piece 14, which leads to the anti-friction bearing 23 by means of which the two clutch parts 24 and 25 and/or the connecting shaft piece 12 and the inner drive shaft piece 14 are rotatably mounted relative to each other. Said supply line 32 likewise can extend in longitudinal direction through the drive shaft 11 and at its end facing away from the clutch 16 be suitably connected to a lubricating oil reservoir.

The clutch chamber 17 can be formed as dry chamber or as so-called "Dry Case", wherein in this case a drain channel 33 can be provided on the bottom side of the clutch chamber 17, cf. FIG. 2. As an alternative to such Dry Case design the clutch 16 can however also be designed with an oil sump lubrication, wherein here as well a drain hole to be closed or a corresponding drain channel 33 for draining and changing the oil sump can be provided.

By means of the integrated clutch 16 the hydraulic unit 4 can be operated much more energy-efficiently, wherein in particular churning and drag losses can be avoided at idle, when the hydraulic unit is not needed. For example, when the assembly driven by the hydraulic unit 4 is not required at the moment, the hydraulic unit 4 need not be dragged along at idle. The clutch 16 is uncoupled by pressurization via the actuator 27, so that the connecting shaft piece 12 can rotate with the output shaft 6 of the transfer gear 2, but the hydraulic converter 10 is not carried along in the process. However, when the hydraulic unit 4 is needed again, the clutch 16 is switched, i.e. moved into the coupling position by means of the actuator 27, so that the drive movement of the connecting shaft piece 12 is again transmitted to the hydraulic converter 10. For this purpose the hydraulic pressure of the actuator 27 for example can be reduced or shut off, so that the pretensioning device 26 again compresses the disks of the clutch 16.

By means of said pretensioning device 26 it can also be ensured in the case of a system pressure failure that the hydraulic unit 4 again operates and is able to fulfill its tasks.

Since the hydraulic unit 4 can be shut off by means of the integrated clutch 16, considerable savings in energy can be achieved, wherein due to the integration of the clutch 16 into the hydraulic unit 4 no particular measures are necessary at the mechanical transfer gear 2. The user and/or the maintenance man also will find certain advantages, as during installation of the hydraulic unit 4 nothing special actually must be observed and an exchange with conventional hydraulic units 3 without clutch also is possible.

As shown in FIG. 3, the clutch 16 also can be formed as claw clutch whose claws 34 are formed for example in the manner of a spline shaft profile and/or can be brought in engagement with each other and out of engagement from each other by shifting axially parallel to the longitudinal direction of the drive shaft. A shiftable claw part 35 for example can shiftably, but non-rotatably be arranged on a shaft piece, wherein here for example a spline shaft profile 36 can a provide for the shiftability, cf. FIG. 3.

The actuator 27 for actuating the shiftable claw part 35 can include an actuator piston 37 which on the one hand can be pretensioned into the engaging position by a pretensioning device 26 in the form of a spring means and can be brought into the disengaged position by hydraulic actuation against the pretensioning device 26, as is shown in FIG. 3.

To monitor the coupling condition of the clutch 16, a monitoring device 38 for monitoring the position of the clutch can include a position sensor 39 which can monitor the position of the shiftable clutch part or claw part 35 and/or the position of the actuating piston 37. As shown in FIG. 3, the actuating piston 37 for example can include a shoulder whose position can be detected by the position sensor 39.

Alternatively or in addition to such position sensor 39, the monitoring device 38 also can have a pressure sensor 40 which monitors or detects the actuating pressure for the hydraulic actuation of the clutch 16.

Advantageously, the monitoring device 38 can monitor both the position of the movable clutch part and the hydraulic actuation pressure and correspondingly can be formed redundantly.

We claim:

1. A hydraulic unit comprising:
a housing;
a hydraulic converter accommodated in the housing, wherein the hydraulic converter is coupled with a drive shaft, wherein the drive shaft comprises an external connecting shaft piece located outside the housing for connection to a mechanical drive element,
wherein the housing houses a clutch for coupling and uncoupling the external connecting shaft piece to and/or from the hydraulic converter, wherein the clutch comprises a first clutch part and a second clutch part, the first clutch part and the second clutch part being releasably engaged to each other,
wherein the drive shaft comprises an inner drive shaft piece in the interior space of the housing, which is non-rotatably connected with the hydraulic converter and is releasably non-rotatably connectable with the external connecting shaft piece by the clutch,
wherein the inner drive shaft piece and the external connecting shaft piece are arranged coaxially to each other,
wherein the clutch is arranged radially on the outside above the inner drive shaft piece and outside above the external connecting shaft piece,
wherein the external connecting shaft piece has a cup-shaped portion surrounding an end of the inner drive shaft piece and ending at the clutch,
wherein the clutch overlaps with the inner and external shaft pieces when viewed in a radial direction,
wherein the first clutch part is fixedly connected to the external connecting shaft piece, the second clutch part is fixedly connected to the inner drive shaft piece, and the first and second clutch parts are rotatably mounted relative to each other by an anti-friction bearing,
wherein the inner drive shaft piece, the cup-shaped portion, the first clutch part, and the second clutch part are arranged to overlap the anti-friction bearing when viewed in a radial direction, and
wherein the cup-shaped portion includes a sleeve-shaped coupling piece having an inner peripheral surface and an outer peripheral surface, wherein the inner peripheral surface and the outer peripheral surface overlap each other when viewed in a radial direction, wherein the outer peripheral surface is fixedly connected to the first clutch part, and wherein the inner peripheral surface is connected to and supports the anti-friction bearing.

2. The unit of claim 1, wherein the clutch is hydraulically actuatable.

3. The unit of claim 1, wherein the clutch comprises an energy-autarkical pretensioning device for pretensioning the clutch into the engaged position and an actuator for moving the clutch into the disengaged position against the pretension of the pretensioning device.

4. The hydraulic unit of claim 1, wherein the drive shaft comprises a supply channel for supplying hydraulic oil for hydraulically switching the clutch.

5. The hydraulic unit of claim 1, wherein the housing has a clutch chamber in which the clutch is accommodated and which is closed towards an outer side of the housing by at least being sealed by a seal.

6. The hydraulic unit of claim 5, wherein in addition to the clutch chamber the housing comprises a converter chamber in which the hydraulic converter is accommodated, wherein the converter chamber and clutch chamber are separated from each other by at least one housing wall.

7. The hydraulic unit of claim 1, wherein the drive shaft is rotatably mounted on the housing, and wherein a bearing is between the hydraulic converter and the clutch.

8. The hydraulic unit of claim 6, wherein the drive shaft is rotatably mounted on the housing, and wherein a bearing is between the hydraulic converter and the clutch, and wherein the bearing supports the drive shaft on the housing wall which separates the clutch chamber and converter chamber from each other.

9. The hydraulic unit of claim 1, wherein the clutch comprises a multidisk clutch.

10. The hydraulic unit of claim 1, wherein the clutch comprises a claw clutch.

11. The hydraulic unit of claim 1, wherein a lubricant supply channel for supplying lubricant to the anti-friction bearing is guided through the drive shaft.

12. The hydraulic unit of claim 11, wherein the external connecting shaft piece is rotatably mounted on the inner drive shaft piece by the anti-friction bearing.

13. The hydraulic unit of claim 1, further comprising a monitoring device for monitoring the position of the clutch, wherein the monitoring device comprises a position sensor for detecting the position of a movable clutch part or a pressure sensor for detecting a clutch actuating pressure.

14. The hydraulic unit of claim 1, further comprising a monitoring device for monitoring the position of the clutch, wherein the monitoring device comprises a position sensor for detecting the position of a movable clutch part and a pressure sensor for detecting a clutch actuating pressure, wherein the movable clutch and the pressure sensor are configured to operate redundantly.

15. A hydraulic driving device comprising:
the hydraulic unit of claim 1; and
a transfer gear connected to the hydraulic unit.

16. A hydraulic unit comprising:
a housing;
a hydraulic converter accommodated in the housing, wherein the hydraulic converter is coupled with a drive shaft, wherein the drive shaft comprises a connecting shaft piece located outside the housing for connection to a mechanical drive element,
wherein the housing houses a clutch for coupling and uncoupling the connecting shaft piece to and/or from the hydraulic converter,
wherein the clutch comprises a first clutch part and a second clutch part which are rotatably supported relative to each other by an anti-friction bearing formed by two roller bearings radially inside the clutch, wherein the first and second clutch parts overlap with each other in a radial direction, wherein clutch elements achieving a non-rotatable engagement are positioned radially outwardly from the anti-friction bearing supporting the first and second clutch parts and overlap with the first and second clutch parts when viewed in a radial direction, wherein the anti-friction bearing overlaps with the clutch elements when viewed in a radial direction, wherein the drive shaft comprises an inner drive shaft piece in the interior space of the housing, which is non-rotatably connected with the hydraulic converter and is releasably non-rotatably connectable with the connecting shaft piece by the clutch, wherein the inner drive shaft piece and the connecting shaft piece are arranged coaxially to each other, wherein the clutch is arranged radially on the outside above the inner drive shaft piece and outside above the external connecting shaft piece, wherein the connecting shaft piece has a cup-shaped portion surrounding an end of the inner drive shaft piece and ending at the clutch, wherein the clutch overlaps with the connecting shaft piece and the inner shaft piece when viewed in a radial direction, a first lubricant supply line for supplying lubricant to the anti-friction bearing extends in a longitudinal direction through the inner drive shaft piece, the first lubricant supply line leading to the anti-friction bearing, a second lubricant supply line extending through the inner drive shaft piece to supply pressurized hydraulic fluid to a clutch actuating chamber to actuate the first and second clutch parts relative to each other, wherein the clutch comprises an energy-autarkical pretensioning device for pretensioning the clutch into the engaged position and an actuator for moving the clutch into the disengaged position against the pretension of the pretensioning device, and wherein the actuator and the clutch actuating chamber overlap with the pretensioning device but not with the first and second clutch parts when viewed in a radial direction.

17. The unit of claim 16, wherein the connecting shaft piece is rotatably mounted on the inner drive shaft piece by the anti-friction bearing.

* * * * *